UNITED STATES PATENT OFFICE.

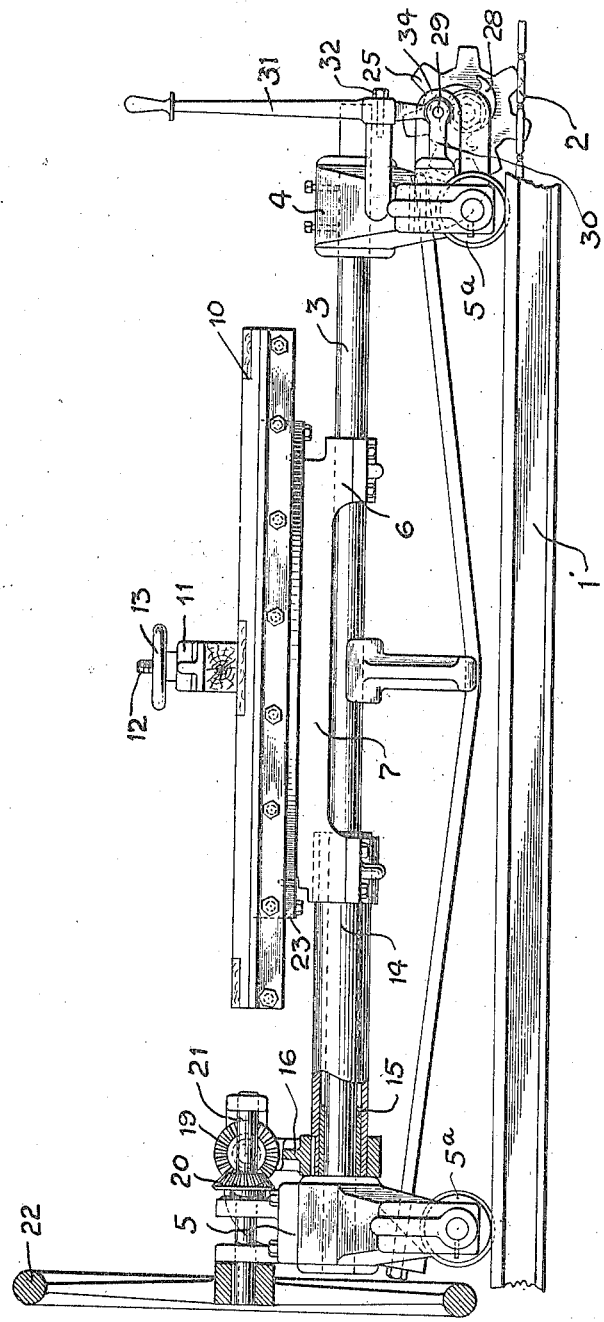

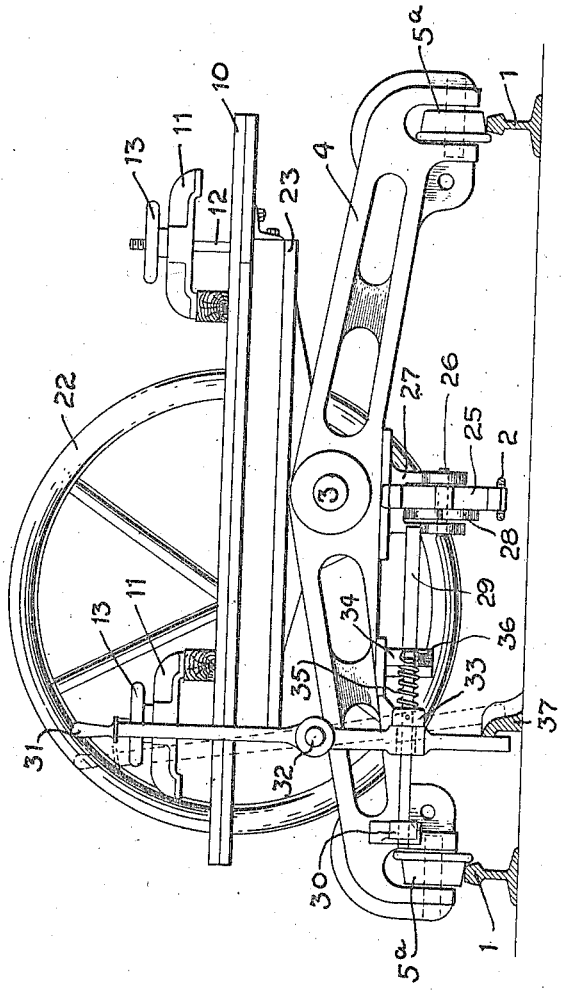

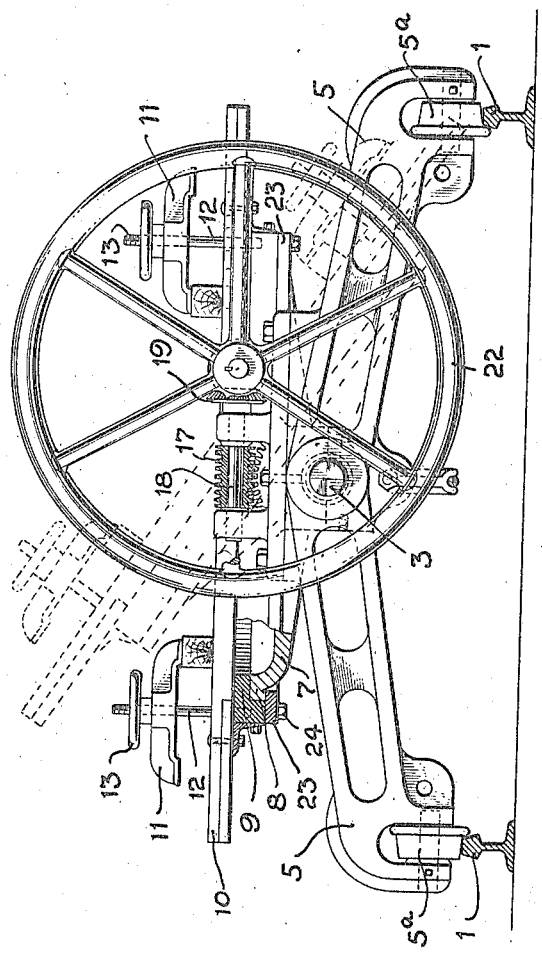

CHARLES E. DRUM, OF DETROIT, MICHIGAN, ASSIGNOR TO SPRINGFIELD BODY CORPORATION OF NEW YORK, OF NEW YORK, N. Y., A CORPORATION OF NEW YORK.

CONVEYER-TRUCK.

1,270,502. Specification of Letters Patent. Patented June 25, 1918.

Application filed March 22, 1917. Serial No. 156,585.

*To all whom it may concern:*

Be it known that I, CHARLES E. DRUM, a citizen of the United States, and a resident of the city of Detroit, county of Wayne, State of Michigan, have invented an Improvement in Conveyer-Trucks, of which the following is a specification.

My invention relates to a movable truck upon which articles to be manufactured are mounted and moved along from one crew of workmen to another, so that successive operations may be performed thereon with the minimum expenditure of labor in handling or shifting the location of the work.

My invention has particular reference to the manufacture of automobile bodies and embodies features of value for this particular kind of work. The so called "chain method" or continuous movement method of manufacture is widely used in certain classes of manufacturing work, such for instance, as the assembling of automobile chassis, but the conditions under which such work is done and the manner by which the work is moved through the factory are altogether inapplicable to the conditions of automobile body manufacture. In manufacturing automobile bodies it is necessary to arrange the moving mechanism so that intermittent movement of the work may be secured, and that the periods of rest of the work may, within a limited extent, be varied at the will of the workmen. This is necessary as the operations performed by each crew of workmen each require considerably more time than the operations performed by the crews in other classes of chain manufacturing as, for instance, assembling automobile chassis and it is, therefore, impossible to use a constantly moving belt upon which the work is mounted, as is sometimes the practice, or to move the work along from crew to crew at certain definite time intervals, as is sometimes also done.

Furthermore, in manufacturing automobile bodies, it is necessary that the working crews have full and immediate access to all parts of the body, since work must be performed upon the top, sides, back and bottom of the body. The fact that an automobile body is such a large and unwieldly piece of work and the further fact that the crews performing the work must of necessity stand at either side of path of movement of the work, introduces many problems which are not found in ordinary manufacturing.

I aim to provide a mechanism which will meet the requirements above outlined, and will produce the desired movements of the work with the minimum effort on the part of the workmen.

In the drawings, Figure 1 is a side view of my improved conveyer truck; Fig. 2 is an end view thereof and Fig. 3 is a view of the opposite end thereof, partly in section.

Referring to the drawings, it will be seen that my improved conveyer truck is mounted upon rails 1, which it will be understood extend throughout that portion of the factory in which the labor upon the work mounted upon the truck is performed, and is adapted to be moved by a constantly moving chain, belt or cable 2. The truck consists essentially of a longitudinal shaft 3, having mounted adjacent its ends, yokes 4 and 5. Yokes 4 and 5 are provided with depending arms adjacent the extremities of which are mounted the supporting wheels 5ª, which rest upon tracks 1. Mounted upon the longitudinal shaft is a supporting yoke 6 carrying a spider 7, having a horizontally disposed flange 8, upon which rests a supporting ring 9 mounted upon the underside of the platform 10. The work rests upon platform 10 and is clamped thereon by means of clamps 11 which are fastened to the platform 10 by means of bolts 12 and hand wheels 13.

One end of the supporting yoke 6 is journaled upon shaft 3 and the other end is fixed to the sleeve 14, which surrounds shaft 3 and is supported by means of suitable bearings 15. At the end of sleeve 14 nearest yoke 5 is mounted a pinion 16 keyed to sleeve 14 and engaged by a worm 17 mounted upon a transverse shaft 18. Transverse shaft 18 carries a beveled gear 19 which is engaged by a beveled pinion 20 mounted upon and rotating with a longitudinal shaft 21. Attached to shaft 21 is a hand wheel 22. It will thus be seen that a rotation of the hand wheel 22 produces rotation of the beveled pinions 19 and 20 and consequently the rotation of the sleeve 14 about the shaft 3, thus tilting the platform 10 to any desired extent. The pitch of the worm and pinion is such that the platform will be held in any position to which it is tilted.

Rotation of the work in the plane of the platform is produced by the sliding of the bearing ring 9 upon the flange 8 of the spider 7, and it will be seen that this rotation may be produced irrespective of the position to which the platform has been tilted by the movement of the hand wheel 22. Attached to the underside of the bearing ring 9 is an adjusting ring 23 held to the bearing ring by means of bolts 24, so that the pressure of the bearing ring 9 upon the flange of the spider may be varied by tightening the bolts 24.

Mounted upon the forward end of the conveyer truck (see Figs. 1 and 2), is a sprocket 25, constantly in engagement with the moving chain 2 and mounted to freely rotate upon its shaft 26, which is attached to yoke 4 by means of bracket 27. Sprocket 25 is thus constantly rotating while the truck is at rest. Carried by sprocket 25 and rotated by it are a pair of projections 28 which may be engaged by dog 29 shown in the drawings in the form of a shaft adapted to slide through apertures in bracket 27 and in boss 30. Movement of the dog 29 is produced by means of an oscillating handle 31, pivoted upon yoke 4 at 32 and bearing against a collar 33 pinned to dog 29. A boss 34 is mounted upon yoke 4 and interposed between this boss and the collar 33 is a spring 35 adapted to return the dog 29 and the handle 31 to their normal position in which dog 29 is out of engagement with the projections 28.

When the handle 31 is moved to the dotted line position, dog 29 will be moved in the path of movement of projections 28, and will thus arrest the movement of the sprocket. This causes the truck to be drawn along by the movement of the chain 2 to the station of the next crew of workmen, where the truck is brought to arrest by movement of the lever 31, back to the full line position of Fig. 2. A detent 36 is provided to assist in holding the dog 29 in engagement with the projections 28.

If desired cam shaped trippers 37 may be connected to the floor at a point adjacent to the stations of the crews of workmen, so that the movement of the conveying truck will be automatically arrested at the proper points.

While I have shown only one modification of my invention, I do not intend to confine myself thereto, as it is evident that many changes in form may be made without departing from the spirit of my invention.

What I claim is:

1. A conveyer truck comprising a plurality of supporting wheels, a platform, positively acting means for tilting the platform about the longitudinal axis of the truck and for holding it in the tilted position and means for rotating the platform in its plane irrespective of the position it is caused to occupy by the tilting means.

2. A conveyer truck, comprising a longitudinal shaft, a platform mounted thereon, a sleeve surrounding the shaft and connected to the platform and means for rotating the sleeve about the shaft and for holding it in any position to which it may be rotated.

3. A conveyer truck, comprising a longitudinal shaft, a platform mounted thereon, a sleeve surrounding the shaft and connected thereto at one end, a pinion carried by the opposite end of the sleeve and a worm engaging the pinion and adapted by its rotation to cause rotation of the sleeve.

4. A conveyer truck, comprising a longitudinal shaft, a pair of transversely disposed yokes attached to the shaft adjacent its ends, supporting wheels carried by the yokes adjacent their extremities, a platform mounted upon the shaft and adapted to be tilted about it and means permitting the rotation of the platform in its plane irrespective of the position to which it is tilted.

5. A conveyer truck, comprising a tiltably mounted platform, a bearing ring carried upon the underside thereof, a flanged supporting spider engaging the under surface of the bearing ring and a clamping ring bearing against the flange upon the spider and adapted to force it into contact with the bearing ring with adjustable pressure.

6. A conveyer truck, comprising a longitudinal shaft, a supporting yoke mounted upon the shaft and adapted to be tilted about it, a supporting spider carried by the yoke and having a circular flange, a platform, a bearing ring attached to the underside thereof and adapted to rest upon the flange of the supporting spider and a clamping ring adapted to force the flange upon the spider into engagement with the bearing ring with adjustable pressure.

7. In a device of the kind described, a conveyer truck, a sprocket mounted upon the truck and adapted to freely rotate, a chain engaged by the sprocket, a projection carried by the sprocket and adapted to be rotated with it and a dog adapted to be moved into the path of movement of the projection, to lock the sprocket against rotation.

8. In a device of the kind described a moving chain, a movable truck, a sprocket mounted thereon and adapted to be freely rotated by the movement of the chain, a projection carried by the sprocket and rotated with it, a dog adapted to be moved into the path of movement of the projection to arrest the rotation of the sprocket, a pivoted handle for moving the dog and a spring adapted to return the dog to its normal position out of the path of movement of the projection.

9. In a device of the kind described, a longitudinal shaft, a pair of transversely disposed yokes, attached to said shaft adjacent its ends, supporting wheels carried by the yokes adjacent their extremities, a moving chain, a sprocket in engagement with said chain and carried by one of said yokes and adapted to freely rotate in response to movement of the chain and means for locking the sprocket against rotation.

10. In a device of the kind described, a longitudinal shaft, a platform tiltably mounted thereon, a pair of yokes having depending arms attached to the shaft adjacent its ends, supporting wheels mounted upon the depending arms of the yokes adjacent their extremities, a moving chain, a sprocket carried by one of the yokes in engagement with the chain and adapted to freely rotate in response to movement of the chain, a projection carried by the sprocket and rotated therewith and a dog adapted to be moved into the path of movement of the projection to arrest the movement of the sprocket.

In testimony whereof, I have signed my name to this specification this 15" day of March, 1917.

CHARLES E. DRUM.